Nov. 8, 1949
C. G. WYNNE
2,487,749
FOUR COMPONENT OPTICAL OBJECTIVE
Filed Feb. 7, 1945
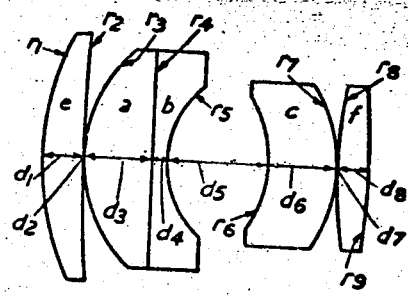
Inventor
Charles G. Wynne
By
Ralph O. Stewart
Attorney Patented Nov. 8, 1949

2,487,749

UNITED STATES PATENT OFFICE 2,487,749

FOUR COMPONENT OPTICAL OBJECTIVE

Charles Gorrie Wynne, Bromley Hill, England, assignor to Wray (Optical Works) Limited, Bromley Hill, England, a British company Application February 7, 1945, Serial No. 576,647
In Great Britain February 25, 1944

6 Claims. (Cl. 88—57)

This invention relates to optical lenses for photographic and like purposes having large relative apertures and corrected for spherical aberrations, coma, field curvature and astigmatism, distortion and chromatic aberrations. More particularly, it is concerned with the type of lens consisting of two meniscus components each having its concave surface of greater curvature than its convex surface and disposed adjacent to, one on each side of, and concave to the aperture stop, and two convergent lenses, one on the side of each of the menisci remote from the stop, each of these convergent lenses being either a single lens or a cemented convergent member whose cemented surface, if dispersive, is not sufficiently so to produce jointly with the immediately preceding surface an effect of relative overcorrection of axial spherical aberration on a pencil of light incident on the front of the lens parallel to the axis.

Previous lenses of this type have had the meniscus components each consisting of two or more elements, either cemented together or with small air-spaces between them.

According to the present invention, a lens of the above type has one compound meniscus component and the other meniscus consisting of a single element which may be either the front or back meniscus in the sense that the front is that side of the lens facing the longer conjugate for which the lens is corrected. It is found that it is thus possible to make one cemented surface do the work of two and to obtain equally good or even better correction with such a lens as with the previous lenses of this type already referred to.

A practical example of an objective in accordance with the invention is illustrated in the accompanying drawing.

In that drawing, the meniscus in the form of a compound component $a, b$ is the front meniscus in the sense that the front is the side of the lens in the sense mentioned above, and the back meniscus is a single element $c$ placed on the opposite side of the aperture stop. The front convergent lens $e$ and the back convergent lens $f$ in this example are both single lenses.

Numerical data for this example are set out in Table A below in which $r_1, r_2 \ldots r_9$ are the radii of curvature of the surfaces marked, a surface with convexity to the front being indicated as having a positive radius and a surface with concavity to the front as having a negative radius of curvature; $d_1, d_2 \ldots d_8$ denote the axial thicknesses of the individual elements or the axial separations between successive surfaces; $n_1, n_2 \ldots n_5$ the mean refractive indices of the glasses used, and $V_1, V_2 \ldots V_5$ their Abbé V numbers.

Table A

[Equivalent focal length = 1.00. Relative aperture F/1.9]

| Element | Radius | Thickness or Separation | Refractive Index | Abbé V Number |
|---|---|---|---|---|
| a | $r_1$ +.5798 | $d_1$ .0876 | $n_1$ 1.610 | $V_1$ 53.2 |
|   | $r_2$ +5.584 | $d_2$ 0 |   |   |
|   | $r_3$ +.3110 |   |   |   |
| a |   | $d_3$ .1462 | $n_2$ 1.610 | $V_2$ 53.2 |
|   | $r_4$ — |   |   |   |
| b | $r_5$ +.2059 | $d_4$ .0277 | $n_3$ 1.700 | $V_3$ 30.2 |
|   |   | $d_5$ .2075 |   |   |
|   | $r_6$ —.2664 |   |   |   |
| c |   | $d_6$ .1337 | $n_4$ 1.613 | $V_4$ 59.2 |
|   | $r_7$ —.3069 | $d_7$ 0 |   |   |
|   | $r_8$ +.9810 |   |   |   |
| f |   | $d_8$ .0646 | $n_5$ 1.613 | $V_5$ 59.2 |
|   | $r_9$ —3.327 |   |   |   |

The invention may be applied to lenses having various additional features, apart from that of one of the convergent lenses $e$ or $f$ being a cemented member with a dispersive cemented surface of limited effect as already mentioned above. Thus, the single convergent lens $e$ or $f$, either at the front or the back, may be replaced by two single lenses to enable the relative aperture to be increased. Again, cemented surfaces may be added either making the outside members cemented doublets or triplets.

In place of cemented surfaces, small air spaces bounded by surfaces of the same or slightly different radii of curvature may be provided. Furthermore, the lens may be composed in part or entirely of the relatively recent high refractive index glasses or of the more normal glasses. One or more of the lens elements may be formed of transparent crystal; for example, very good secondary spectrum correction may be obtained by using an alkali metal halide such as potassium bromide or iodide for the divergent element in the cemented meniscus together with suitably selected glasses for the other members.

Finally, some of the surfaces may be made to depart slightly from the spherical form.

I claim:

1. An optical objective comprising an aperture stop, a front meniscus component of compound structure arranged on the front side of said aperture stop and having an outer concave surface facing said stop with a radius of curvature of substantially 0.2 times the equivalent focal lenth of the objective and an outer convex surface with a radius of curvature of substantially 0.3 times said focal length, a single-element meniscus component positioned at the back of said aperture stop in axial alignment with said front meniscus component and having a concave surface facing said stop with a radius of curvature of substantially 0.26 times said focal length and an outer convex surface of a radius of substantially 0.3 times said focal length, a convergent component arranged in front of said front meniscus, and a convergent component arranged in the rear of said back meniscus.

2. An optical objective according to claim 1 wherein said front meniscus is formed of a cemented doublet.

3. An optical objective according to claim 1 wherein said front and rear convergent components are formed of single-element lenses and are substantially in contact with the convex surfaces of the front and back meniscus components.

4. A five-glass optical objective having a relative aperture not less than F/2.5 and consisting of an aperture stop, two meniscus components disposed adjacent to and concave to said aperture stop and one on each side of said aperture stop, one of said meniscus components being a cemented doublet and the other being a single glass element having a concave surface of a radius not less than 0.52 and not more than 0.95 times the radius of curvature of its convex surface which has a radius of curvature not less than 0.25 and not more than 0.75 times the equivalent focal length of the objective, and two single glass convergent lenses, one on the side of each of said meniscus components remote from said aperture stop.

5. A five-glass optical objective according to claim 4 wherein said cemented doublet has a concave outer surface formed on a radius between 0.45 and 0.90 of the radius of curvature of its outer convex surface which has a radius of curvature between 0.20 and 0.60 of the equivalent focal length of the objective.

6. An optical objective comprising four axially aligned components including two meniscus components arranged on opposite sides of an aperture stop, each being concave to said stop and one being a cemented doublet, and a pair of convergent components arranged on the opposite sides of said meniscus components from said aperture stop, said components having numerical data substantially as set forth in the following table:

[Equivalent focal length=1.00]

| Element | Radius | Thickness or Separation | Refractive Index | Abbé V Number |
|---|---|---|---|---|
| a | $r_1=+.5796$ | $d_1=.0876$ | $n_1=1.610$ | $V_1=51.3$ |
|   | $r_2=+5.584$ | $d_2=0$ |   |   |
| c | $r_3=+.3110$ | $d_3=.1462$ | $n_2=1.610$ | $V_2=53.3$ |
|   | $r_4=\infty$ |   |   |   |
| b | $r_5=+.2059$ | $d_4=.0277$ | $n_3=1.700$ | $V_3=30.3$ |
|   |   | $d_5=.2075$ |   |   |
|   | $r_6=-.2664$ |   |   |   |
| e | $r_7=-.3069$ | $d_6=.1337$ | $n_4=1.613$ | $V_4=59.3$ |
|   |   | $d_7=0$ |   |   |
|   | $r_8=+.9810$ |   |   |   |
| f |   | $d_8=.6646$ | $n_5=1.613$ | $V_5=59.3$ |
|   | $r_9=-3.327$ |   |   |   | wherein $r_1, r_2 \ldots$ indicate the radii of the individual surfaces counting from the front, $d_1, d_3, d_4, d_6, d_8$ indicate the axial thicknesses of the individual elements and $d_2, d_5, d_7$ indicate the axial air separations between the components.

CHARLES GORRIE WYNNE.

REFERENCES CITED

The following references are of record in the file of this patent:

UNITED STATES PATENTS

| Number | Name | Date |
|---|---|---|
| 583,336 | Rudolph | May 25, 1897 |
| 2,012,822 | Lee | Aug. 27, 1935 |
| 2,019,985 | Lee | Nov. 5, 1935 |
| 2,100,290 | Lee | Nov. 23, 1937 |
| 2,100,291 | Lee | Nov. 23, 1937 |
| 2,171,640 | Berek | Sept. 5, 1939 |
| 2,319,171 | Warmisham et al. | May 11, 1943 |

FOREIGN PATENTS

| Number | Country | Date |
|---|---|---|
| 157,040 | Great Britain | Jan. 20, 1921 |
| 544,658 | Great Britain | Apr. 22, 1942 |